US010935818B2

(12) United States Patent
Lam et al.

(10) Patent No.: US 10,935,818 B2
(45) Date of Patent: Mar. 2, 2021

(54) EVENT-BASED, AUTOMATED CONTROL OF VISUAL LIGHT TRANSMISSION THROUGH VEHICLE WINDOW

(71) Applicant: INTERNATIONAL BUSINESS MACHINES CORPORATION, Armonk, NY (US)

(72) Inventors: Ho-Yiu Lam, Mountain View, CA (US); Eric V. Kline, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 24 days.

(21) Appl. No.: 15/975,996

(22) Filed: May 10, 2018

(65) Prior Publication Data
US 2019/0346701 A1 Nov. 14, 2019

(51) Int. Cl.
G02B 26/08 (2006.01)
G02B 26/00 (2006.01)
(Continued)

(52) U.S. Cl.
CPC .............. G02F 1/0121 (2013.01); B60J 3/04 (2013.01); G02F 1/172 (2013.01);
(Continued)

(58) Field of Classification Search
CPC ...... H04N 7/181; H04N 5/23238; H04N 5/28; H04N 7/18; H04N 5/2253; H04N 5/247;
(Continued)

(56) References Cited

U.S. PATENT DOCUMENTS 8,482,834 B2 7/2013 Cordova
8,589,034 B2 11/2013 Kwok
(Continued)

FOREIGN PATENT DOCUMENTS

CN 104669991 A 6/2015
CN 107487161 A 12/2017
(Continued)

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).
(Continued)

Primary Examiner — Brandi N Thomas
(74) Attorney, Agent, or Firm — Tihon Poltavets, Esq.; Kevin P. Radigan, Esq.; Heslin Rothenberg Farley & Mesiti P.C.

(57) ABSTRACT

Automated control of visual light transmission through one or more vehicle windows is provided, which includes providing a control system for controlling visual light transmission through the window, where the window includes smart glass, with visual light transmission through the window being dynamically adjustable by the control system. The control system receives a video stream from at least one video camera associated with the vehicle, and analyzes the video stream for a specified event. Based on detecting the event, the control system triggers an action to adjust the visual light transmission through the window.

20 Claims, 13 Drawing Sheets

(51) Int. Cl.
  *G02F 1/29* (2006.01)
  *G02F 1/01* (2006.01)
  *B60J 3/04* (2006.01)
  *G02F 1/17* (2019.01)
  *G06K 9/00* (2006.01)

(52) U.S. Cl.
  CPC ..... G06K 9/00288 (2013.01); G06K 9/00718 (2013.01); G06K 9/00845 (2013.01); *G06K 2009/00738* (2013.01)

(58) Field of Classification Search
  CPC ........... H04N 1/00095; H04N 1/00214; H04N 1/00244; H04N 1/00307; H04N 2007/145; H04N 21/2353; H04N 21/41407; H04N 19/40; H04N 19/61; H04N 7/14; H04N 5/2252; H04N 7/142; H04N 5/23216; H04N 5/2628; H04N 5/77; H04N 7/147; H04N 7/157; H04N 9/8205; H04N 5/2254; H04N 5/2257; H04N 5/23206; H04N 5/23229; H04N 5/23241; H04N 7/183; H04N 7/185; G02B 2027/0138; G02B 2027/014; G02B 2027/0178; G02B 2027/0187; G02B 27/017
  USPC ........ 359/237, 242, 265–267, 290–292, 296, 359/298
  See application file for complete search history.

(56) References Cited

U.S. PATENT DOCUMENTS

| | | |
|---|---|---|
| 9,409,464 B2 | 8/2016 | Tomkins et al. |
| 2003/0151272 A1 | 8/2003 | Sugimoto et al. |
| 2010/0165099 A1* | 7/2010 | Marchthaler ......... B60J 3/0204 348/135 |
| 2012/0303214 A1 | 11/2012 | Yuter |
| 2014/0148996 A1 | 5/2014 | Watkins |
| 2015/0098121 A1 | 4/2015 | Turnbull et al. |
| 2016/0052374 A1 | 2/2016 | Volbracht |
| 2016/0170206 A1 | 6/2016 | Osborne et al. |
| 2018/0015810 A1 | 1/2018 | Chelian |
| 2018/0089859 A1* | 3/2018 | Lindemann ............ G06T 11/00 |

FOREIGN PATENT DOCUMENTS

| | | |
|---|---|---|
| EP | 2 583 847 B1 | 12/2014 |
| WO | WO 2016/153467 A1 | 9/2016 |

OTHER PUBLICATIONS

Anonymous, "Key Trends and Opportunities for Smart Auto Glass," https://www.azom.com/article.aspx?ArticleID=10658, Feb. 10, 2014 (pp. 1-5).

Anonymous, "Samsung Introduces Us to the Adjustable Transparent Display," http://www.patentlymobile.com/2014/02/samsung-introduces-us-to-the-adjustable-transparent-display.html, Feb. 11, 2014, (pp. 1-11).

Anonymous, "Market Trends: Smart Auto Glass Continues Growth," Ceramic Industry, https://www.ceramicindustry.com/articles/93976-market-trends-smart-auto-glass-continues-growth, Jun. 4, 2014 (pp. 1-5).

O'Callaghan, Johnathan, "End of the Blind Spot? Jaguar Car Gives Drivers 360° Vision Thanks to Cameras That Make Window Pillars 'Transparent'," http://www.dailymail.co.uk/sciencetech/article-2874421/End-blind-spot-Jaguar-car-gives-drivers-360-vision-thanks-cameras-make-window-pillars-transparent.html, Dec. 15, 2014 (pp. 1-4).

Anonymous, "Finished Smart Glass," https://www.glass-apps.com/products/smart-glass-windows/, [Retrieved from the Internet on May 3, 2018], (pp. 1-4).

* cited by examiner

```
┌─────────────────────────────────────────────────────────────────────┐
│  ┌───────────────────────────────────────────────────────────┐      │
│  │ CONTROLLING VISUAL LIGHT TRANSMISSION THROUGH A WINDOW OF A│      │
│  │ VEHICLE, BY:                                               │      │
│  │                                                            │      │
│  │   - PROVIDING A CONTROL SYSTEM FOR CONTROLLING VISUAL LIGHT│      │
│  │     TRANSMISSION THROUGH THE WINDOW, THE WINDOW INCLUDING  │      │
│  │     SMART GLASS, WITH VISUAL LIGHT TRANSMISSION THROUGH THE│─ 500 │
│  │     WINDOW BEING DYNAMICALLY ADJUSTABLE BY THE CONTROL     │      │
│  │     SYSTEM, WHERE THE CONTROL SYSTEM:                      │      │
│  │                                                            │      │
│  │      - RECEIVES A VIDEO STREAM FROM AT LEAST ONE VIDEO     │      │
│  │        CAMERA ASSOCIATED WITH THE VEHICLE; AND             │      │
│  │                                                            │      │
│  │      - ANALYZES THE VIDEO STREAM FOR A SPECIFIED EVENT,    │      │
│  │        WHERE DETECTION OF THE EVENT TRIGGERS AN ACTION BY  │      │
│  │        THE CONTROL SYSTEM TO ADJUST THE VISUAL LIGHT       │      │
│  │        TRANSMISSION THROUGH THE WINDOW.                    │      │
│  └───────────────────────────────────────────────────────────┘      │
│                                                                     │
│  ┌───────────────────────────────────────────────────────────┐      │
│  │   WHERE THE VIDEO STREAM IS CAPTURED BY AT LEAST ONE       │      │
│  │   IN-VEHICLE VIDEO CAMERA IMAGING, AT LEAST IN PART, ONE   │─ 505 │
│  │   OR MORE OCCUPANTS OF THE VEHICLE, AND THE EVENT IS AN    │      │
│  │   OCCUPANT-RELATED EVENT                                   │      │
│  └───────────────────────────────────────────────────────────┘      │
│                                                                     │
│  ┌───────────────────────────────────────────────────────────┐      │
│  │  WHERE THE WINDOW OF THE VEHICLE IS A SIDE WINDOW OF THE   │      │
│  │  VEHICLE, THE OCCUPANT-RELATED EVENT IS AN OCCUPANT OF THE │      │
│  │  VEHICLE SLEEPING, AND THE CONTROL SYSTEM IS CONFIGURED TO │─ 510 │
│  │  AUTOMATICALLY DECREASE VISUAL LIGHT TRANSMISSION THROUGH  │      │
│  │  THE SIDE WINDOW BASED ON DETECTING THE EVENT              │      │
│  └───────────────────────────────────────────────────────────┘      │
│                                                                     │
│  ┌───────────────────────────────────────────────────────────┐      │
│  │   WHERE THE SIDE WINDOW OF THE VEHICLE IS ONE SIDE WINDOW  │      │
│  │   OF MULTIPLE SIDE WINDOWS OF THE VEHICLE, THE ONE SIDE    │─ 515 │
│  │   WINDOW BEING LOCATED CLOSEST TO THE OCCUPANT OF THE      │      │
│  │   VEHICLE                                                  │      │
│  └───────────────────────────────────────────────────────────┘      │
│                                                                     │
│  ┌───────────────────────────────────────────────────────────┐      │
│  │  IN WHICH THE WINDOW OF THE VEHICLE IS A SIDE WINDOW OF THE│      │
│  │  VEHICLE, THE OCCUPANT-RELATED EVENT IS AN OCCUPANT OF THE │      │
│  │  VEHICLE TURNING TO LOOK OUT THE SIDE WINDOW, AND THE      │─ 520 │
│  │  CONTROL SYSTEM IS CONFIGURED TO AUTOMATICALLY INCREASE    │      │
│  │  VISUAL LIGHT TRANSMISSION THROUGH AT LEAST A PORTION OF   │      │
│  │  THE SIDE WINDOW BASED ON DETECTING THE EVENT              │      │
│  └───────────────────────────────────────────────────────────┘      │
└─────────────────────────────────────────────────────────────────────┘
```

FIG. 5A

WHERE THE WINDOW OF THE VEHICLE IS A SIDE WINDOW OF THE VEHICLE, THE AT LEAST ONE VIDEO CAMERA ASSOCIATED WITH THE VEHICLE IS POSITIONED TO IMAGE, AT LEAST IN PART, A REGION OUTSIDE THE VEHICLE, AND THE EVENT IS AN OUTSIDE THE VEHICLE EVENT, AND THE CONTROL SYSTEM IS CONFIGURED TO AUTOMATICALLY INCREASE VISUAL LIGHT TRANSMISSION THROUGH THE SIDE WINDOW BASED ON DETECTING THE OUTSIDE THE VEHICLE EVENT ~525

WHERE THE OUTSIDE THE VEHICLE EVENT IS ANOTHER VEHICLE APPROACHING THE VEHICLE ~530

WHERE THE ANALYZES INCLUDES PERFORMING FACIAL RECOGNITION ANALYSIS ON AN INDIVIDUAL APPROACHING THE VEHICLE, AND THE EVENT INCLUDES IDENTIFYING BY THE FACIAL RECOGNITION ANALYSIS THE INDIVIDUAL AS AN AUTHORIZED USER OF THE VEHICLE, AND WHEREIN THE CONTROL SYSTEM IS CONFIGURED TO AUTOMATICALLY ADJUST VISUAL LIGHT TRANSMISSION THROUGH THE WINDOW FOR THE AUTHORIZED USER TO A SPECIFIED LEVEL ~535

WHERE THE CONTROL SYSTEM IS CONFIGURED TO AUTOMATICALLY INCREASE VISUAL LIGHT TRANSMISSION THROUGH THE WINDOW FOR THE AUTHORIZED USER ~540

WHERE THE ANALYZES INCLUDES PERFORMING FACIAL RECOGNITION ANALYSIS ON AN INDIVIDUAL APPROACHING THE VEHICLE, AND THE EVENT INCLUDES IDENTIFYING BY THE FACIAL RECOGNITION ANALYSIS THE INDIVIDUAL AS AN UNAUTHORIZED USER OF THE VEHICLE, AND WHEREIN THE CONTROL SYSTEM IS CONFIGURED TO AUTOMATICALLY DECREASE VISUAL LIGHT TRANSMISSION THROUGH THE WINDOW FOR THE UNAUTHORIZED USER ~545

WHERE THE EVENT IS ONE SPECIFIED TYPE OF EVENT OF MULTIPLE SPECIFIED TYPES OF EVENTS, EACH SPECIFIED TYPE OF EVENT OF THE MULTIPLE SPECIFIED TYPES OF EVENTS TRIGGERING A RESPECTIVE ACTION BY THE CONTROL SYSTEM TO ADJUST THE VISUAL LIGHT TRANSMISSION THROUGH THE WINDOW, THE RESPECTIVE ACTIONS INCLUDING MULTIPLE DIFFERENT PRESPECIFIED ACTIONS TO BE TAKEN BY THE CONTROL SYSTEM TO ADJUST THE LEVEL OF VISUAL LIGHT TRANSMISSION THROUGH THE WINDOW BASED ON THE SPECIFIED TYPE OF EVENT ~550

FIG. 5B

EVENT-BASED, AUTOMATED CONTROL OF VISUAL LIGHT TRANSMISSION THROUGH VEHICLE WINDOW

BACKGROUND

Windows of motor vehicles, electric vehicles, railed vehicles, etc., are typically made of laminated safety glass, which may be formed of two or more straight or curved sheets of glass with, for instance, a plastic layer laminated between the layers for safety. The vehicle windows are often selectively tinted. In practical terms, window tinting refers to methods that prevent certain levels of light from passing through the safety glass, whether (for instance) the windshield, side window(s), rear window, etc., of a vehicle. For example, factory tint is standard on the back half of most trucks and sport utility vehicles. With a common visual light transmission (VLT) of 15%-26%, factory window tint may be installed to provide passengers and their personal items a measure of privacy, as well as to assist in maintaining the interior of the vehicle cooler in warm weather.

SUMMARY

Certain shortcomings of the prior art are overcome and additional advantages are provided through the provision of a method of controlling visual light transmission through a window of a vehicle. The method includes providing a control system for controlling visual light transmission through the window. The window includes smart glass, with visual light transmission through the window being dynamically adjustable by the control system. The control system receives a video stream from at least one video camera associated with the vehicle, and analyses the video stream for a specified event. Based on detecting the event, the control system triggers an action to adjust the visual light transmission through the window.

In another aspect, a system for controlling visual light transmission through a window of a vehicle is provided. The system includes a memory, and a processor communicatively coupled to the memory. The system performs a method, which includes controlling visual light transmission through the window, where the window includes smart glass, with visual light transmission through the window being dynamically adjustable. The controlling includes receiving a video stream from at least one video camera associated with the vehicle, and analyzing the video stream for a specified event. Upon detection, the event triggers an action to adjust the visual light transmission through the window.

In a further aspect, a computer program product for controlling visual light transmission through a window of a vehicle is provided. The computer program product includes a computer readable storage medium having program instructions embodied therewith. The program instructions are executable by a processor to cause the processor to control visual light transmission through the window. The window includes smart glass, with visual light transmission through the window being dynamically adjustable, and the control includes receiving a video stream from at least one video camera associated with the vehicle, and analyzing the video stream for a specified event. Detection of the event triggers an action by the control to adjust the visual light transmission through the window.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 5A & 5B depict further embodiments of details relating to one or more aspects of controlling visual light transmission through a window of a vehicle, in accordance with one or more aspects of the present invention;

DETAILED DESCRIPTION

Figure 1:
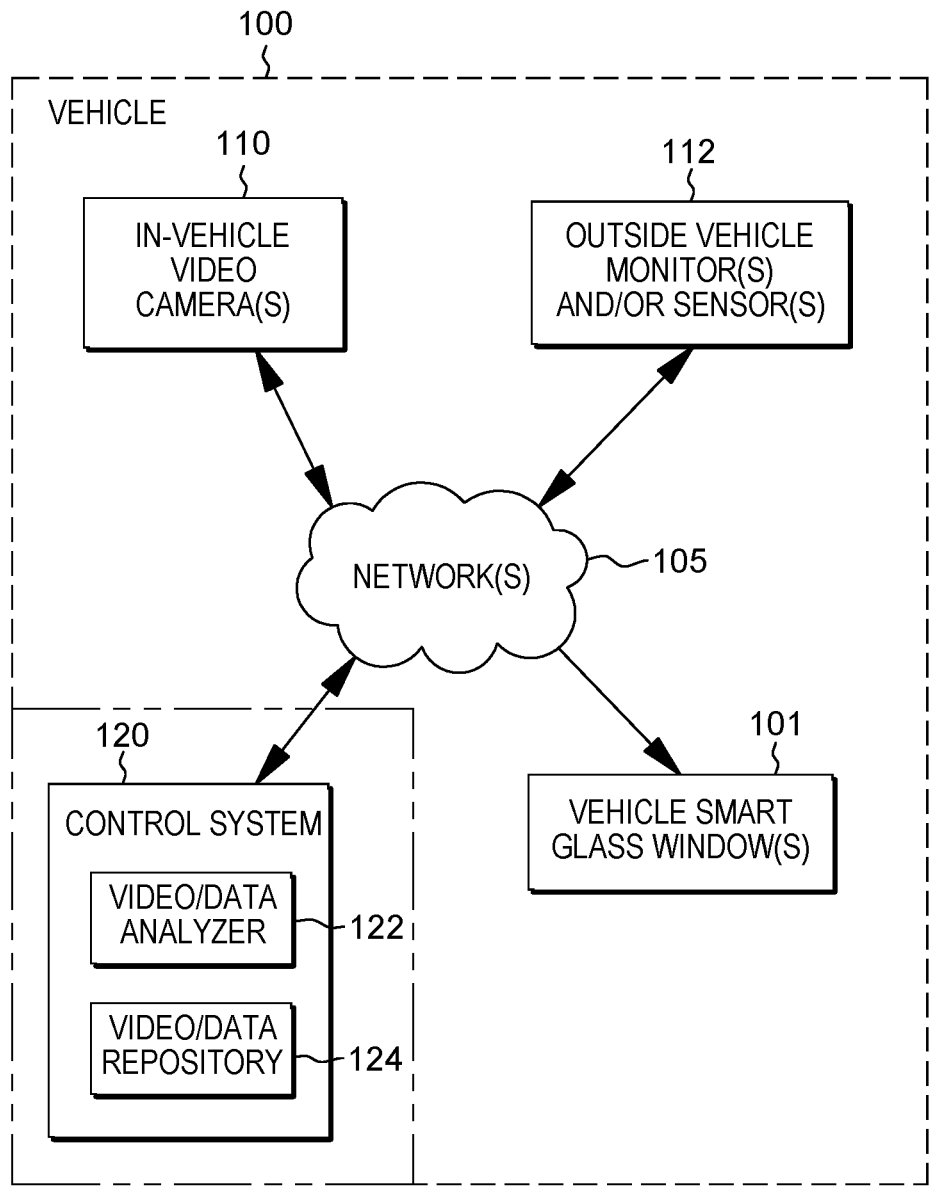
FIG. 1 depicts one embodiment of a system for controlling visual light transmission through one or more windows of a vehicle, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, providing a process, system and/or computer program product for controlling visual light transmission through one or more windows of a vehicle.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

In accordance with one or more aspects, a vehicle event processing capability is provided that includes, for instance, controlling visual light transmission through one or more windows of the vehicle, where the one or more windows of the vehicle are, or include, smart glass with visual light transmission through the window(s) being dynamically adjustable by, for instance, a control system. In one or more aspects, a video stream is received from at least one video camera associated with the vehicle, and the video stream is analyzed by the control system for an event, such as a specified type of event. Upon detection of the event, an action is triggered by the control system to adjust visual light transmission through the window.

The vehicle may be a motor vehicle or electric vehicle, such as a car, sport utility vehicle, truck, recreational vehicle, a railed vehicle, such as a train or tram, a watercraft, etc. Further, the one or more video cameras may be any imaging device associated with the vehicle for producing, for instance, a video transmission. The video stream or transmission may be streaming or not streaming (e.g., a series of discrete images), and may be digital or analog. By way of example, the video camera may be, in one or more aspects, a high-resolution video imaging camera, such as a 1080p HD camera, as well as others. In one or more aspects, the one or more video cameras may include at least one in-vehicle video camera imaging the interior of the vehicle when operational to image, for instance, the one or more occupants of the vehicle (such as a driver and/or one or more passengers) for use in controlling visual light transmission through one or more smart glass windows, as described herein. Further, in one or more aspects, the one or more video cameras may include one or more video cameras or other monitors monitoring, at least in part, outside of the vehicle for an event which may be, for instance, another vehicle approaching the vehicle, an individual approaching the vehicle, an object approaching the vehicle, etc.

Smart glass, such as a smart glass window or switchable glass window, refers to a glass or glazing whose light transmission properties may be altered when voltage is applied. Such electrically switchable smart glass may include one or more suspended-particle devices (SPD) where, for instance, a thin film laminate of rod-like nanoscale particles may be suspended in a liquid and placed between two pieces of glass or plastic, or attached to one layer. When no voltage is applied, the suspended particles may be randomly organized, thus blocking or absorbing light. When voltage is applied, the suspended particles align and let light pass. Varying the voltage of the film varies the orientation of the suspended particles, thereby regulating the tint of the glazing and the amount of visual light transmission through the window. Suspended particle devices may be automatically tuned to precisely control the amount of light, glare and heat passing through the window. The smart glass window can be controlled as described herein for instance, through an enhanced, automated control method, system and/or computer program product based on various types of specified events.

Advantageously, smart glass light control technology may increase a vehicle occupant's control over, and enjoyment of their environment, and provide for better user comfort and well-being, while improving energy efficiency. For instance, today's smart glass technology can provide over 99% UV blockage and state switching in a second or two. In vehicles, the range of light transmission for the technology may be 50-60 times darker than a typical sunroof and/or twice as clear as an ordinary sunroof.

By way of example, FIG. 1 depicts a schematic of one embodiment of a vehicle 100 having one or more smart glass vehicle windows 101. Note that the concepts disclosed herein may apply to any window of a vehicle depending, for instance, on the aspect at issue. Certain aspects disclosed herein have particular applicability to side windows of the vehicle, while other aspects have applicability to any window of the vehicle.

In accordance with one or more aspects, the system may include an in-vehicle camera(s) 110 monitoring within the vehicle and one or more monitor(s) and/or sensor(s) 112 associated with the vehicle monitoring outside the vehicle. For instance, one or more in-vehicle video cameras may be oriented to image the interior cabin of the vehicle to, for instance, capture video of the occupants of the vehicle, while one or more other video cameras and/or data sensors may be oriented to capture events occurring outside of the vehicle. One or more video streams may be provided by in-vehicle camera 110 and/or outside vehicle monitor(s) and/or sensor(s) 112 to a control system 120, which may include (in part) a video/data analyzer 122 and a video/data repository 124 to facilitate implementing one or more aspects of the processing disclosed herein.

Note that one or more aspects of control system 120 may be implemented with, or resident within, vehicle 100 and/or may be remote from the vehicle, such as cloud-based aspects of the control system. Depending on the location, control system 120 may receive the video stream(s) and/or other data from in-vehicle camera(s) 110 and outside vehicle monitor(s) and/or sensor(s) 112 across a network 105, and provide one or more control signals across the same network or a different network to one or more vehicle smart glass windows 101 to control visible light transmission through the windows. By way of example, and depending on the location of control system 120, network 105 may be a telecommunications network, a local area network (LAN), a wide area network (WAN), such as the Internet, or a combination thereof, and include wired, wireless, fiber optic connections, etc. The network may include one or more wired and/or wireless networks that are capable of receiving and transmitting data, including image and/or video signals (i.e., a video stream).

Control system 120 may be, for instance, a computer system, and the in-vehicle video camera(s) 110 and/or outside vehicle monitor(s) and/or sensor(s) 112 may be integrated as part of the control system or separate. By way of example, the control system may include one or more processors, for instance, central processing units (CPU's). A processor can include functional components used in the execution of instructions such as functional components to fetch program instructions from locations such as cache or main memory, decode program instructions and execute program instructions, access memory for instruction execution, and write results of the executed instructions. A processor can also include a register(s) to be used by one or more of the functional components. The control system may include, for instance, memory, input/output (I/O), network interface and storage, which may include one or more data/video repositories 124. The components of the control system may be coupled to each other via one or more buses and/or other connections. Bus connections may represent one or more of any of several types of bus structures, including a memory bus or memory controller, a peripheral bus, an accelerated graphics port, and a processor or local bus using any variety of known bus architectures.

The control system memory can include main or system memory (e.g., random access memory) used in the execution of program instructions, storage device(s) such as hard drive(s), flash media or optical media as examples, and/or cache memory as examples. The memory can include, for instance, a cache, such as a shared cache, which may be coupled to a local cache (examples include L1 cache, L2 cache, etc.) of the processor within the control system. Additional memory may be or include at least one computer program product having a set (for instance, at least one) of program modules, instructions, coded alike that is/are configured to carry out functions and embodiments described herein when executed by one or more processors.

In one or more embodiments, the control system memory can store an operating system and other computer programs, such as one or more computer programs/applications that execute or perform aspects described herein. Specifically, program/applications can include computer readable program instructions that may be configured to carry out functions of embodiments of aspects described herein.

As noted, the control system may include a network interface which may be an example I/O interface that enables the control system to communicate with one or more networks. Further, the storage may be part of the control system or an external storage device. The storage may store one or more programs, one or more computer readable program instructions, and/or data, such as one or more data/video repositories, including in one or more implementations, one or more image databases. The control system may be operational with numerous other general purpose or special purpose computing system environments or configurations. The control system may take any of a variety of forms, such as those described herein. See also in this regard the discussion of FIGS. 6A-8 below.

Figure 2A:
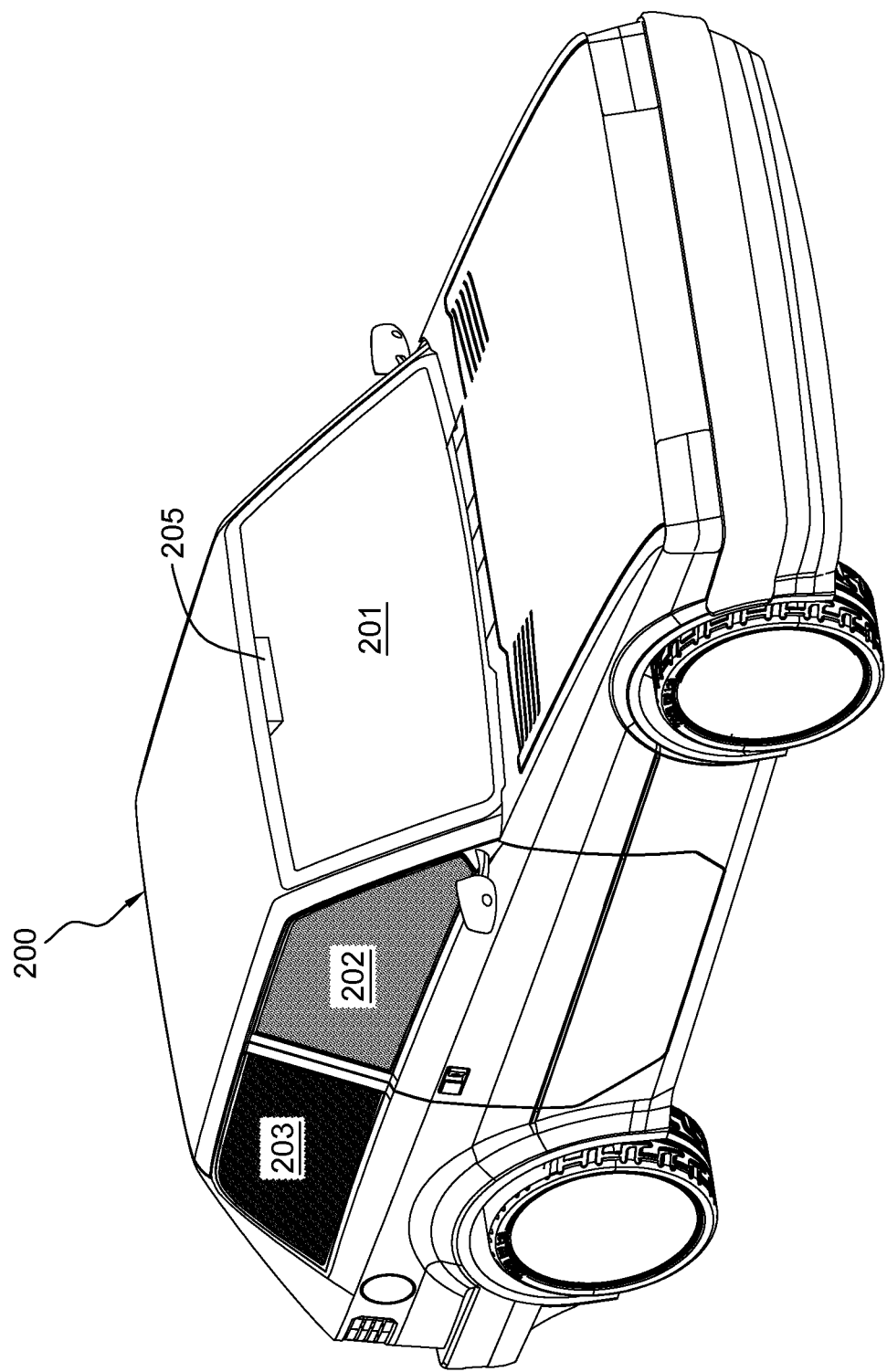
FIGS. 2A-2D depict an example of a vehicle with a system for controlling visual light transmission through multiple windows of the vehicle, in accordance with one or more aspects of the present invention.

FIGS. 2A-2D depict an example of a vehicle, in this case a motor vehicle or electric vehicle 200, with a system 205 for controlling visual light transmission through multiple windows of the vehicle, in accordance with one or more aspects of the present invention. Referring first to FIG. 2A, vehicle 200 includes a windshield 201, and multiple side windows 202, 203, with side window 202 being a front side window, and side window 203 being a rear side window in the embodiment depicted. System 205 is shown associated with vehicle 200, and may include, for instance, one or more in-vehicle video cameras, one or more monitor(s) and/or sensor(s) for monitoring outside the vehicle, and a control system, such as described above in connection with FIG. 1. System 205 may control, in one or more embodiments, visual light transmission through one or more of windshield 201, and side windows 202, 203. For instance, in one or more implementations, the system may control visual light transmission through side windows 202, 203, but not windshield 201, while in one or more other implementations (FIG. 2D), system 205 may control visual light transmission through all the windows of the vehicle 200, including windshield 201.

In the example of FIG. 2A, windshield 201 is shown with maximum visual light transmission, front side window 202 has an intermediate level of visual light transmission through the window, while rear side window 203 is controlled to minimize visual light transmission through the window, with each of the windows controlled by the system assumed to be or include smart glass, such as described herein. As one example, system 205 may control rear side window 203 to minimize visual light transmission through the window in the case where the system detects that a passenger occupant in a back seat of vehicle 200 is sleeping. In such a case, front side window may be set by the system at an intermediate visual light transmission level, while windshield 201, and likely the rear window (not shown) of vehicle 200 remain at a maximum visual light transmission level during vehicle operation.

Figure 2B:
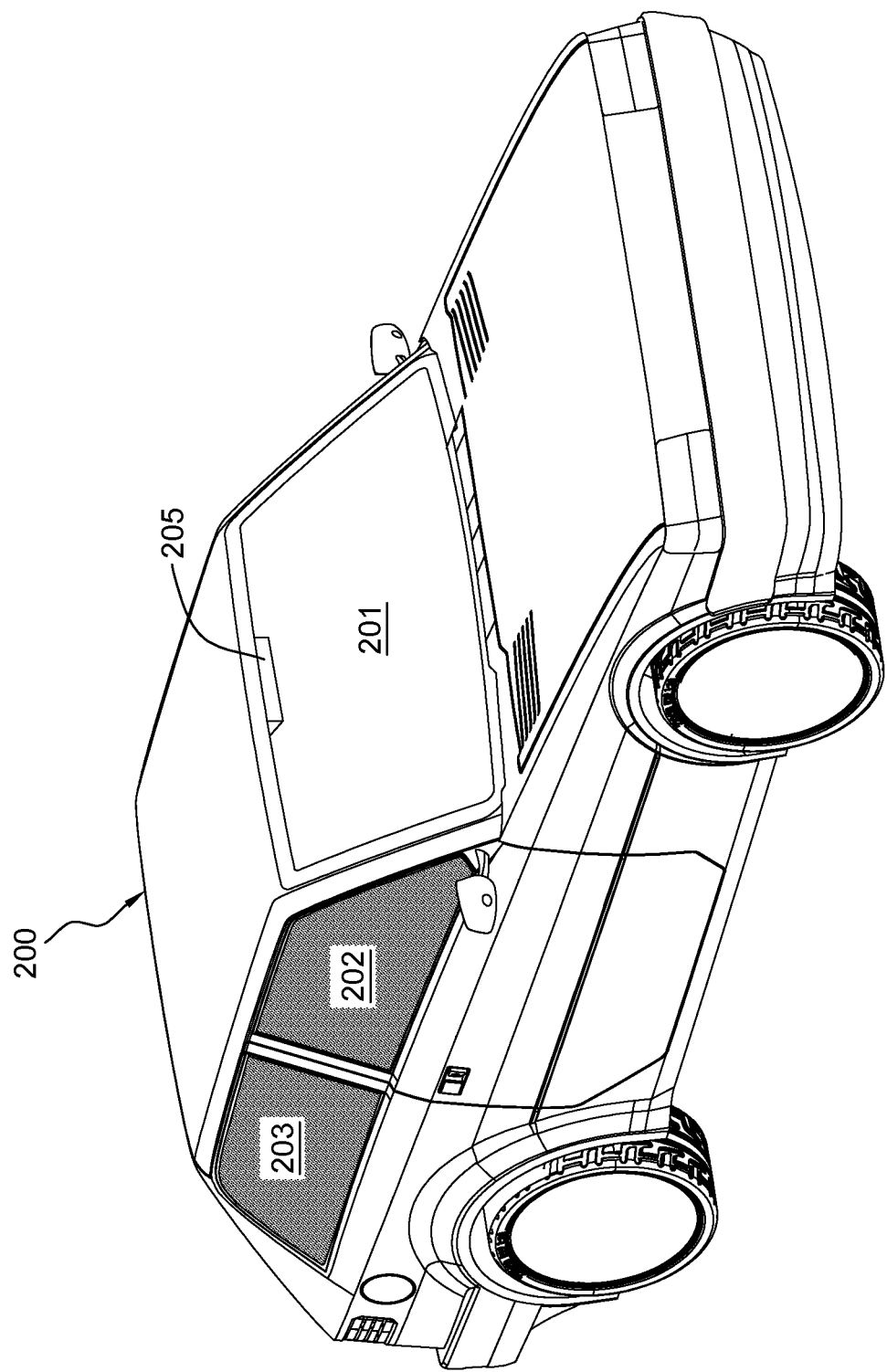
Figure 2C:
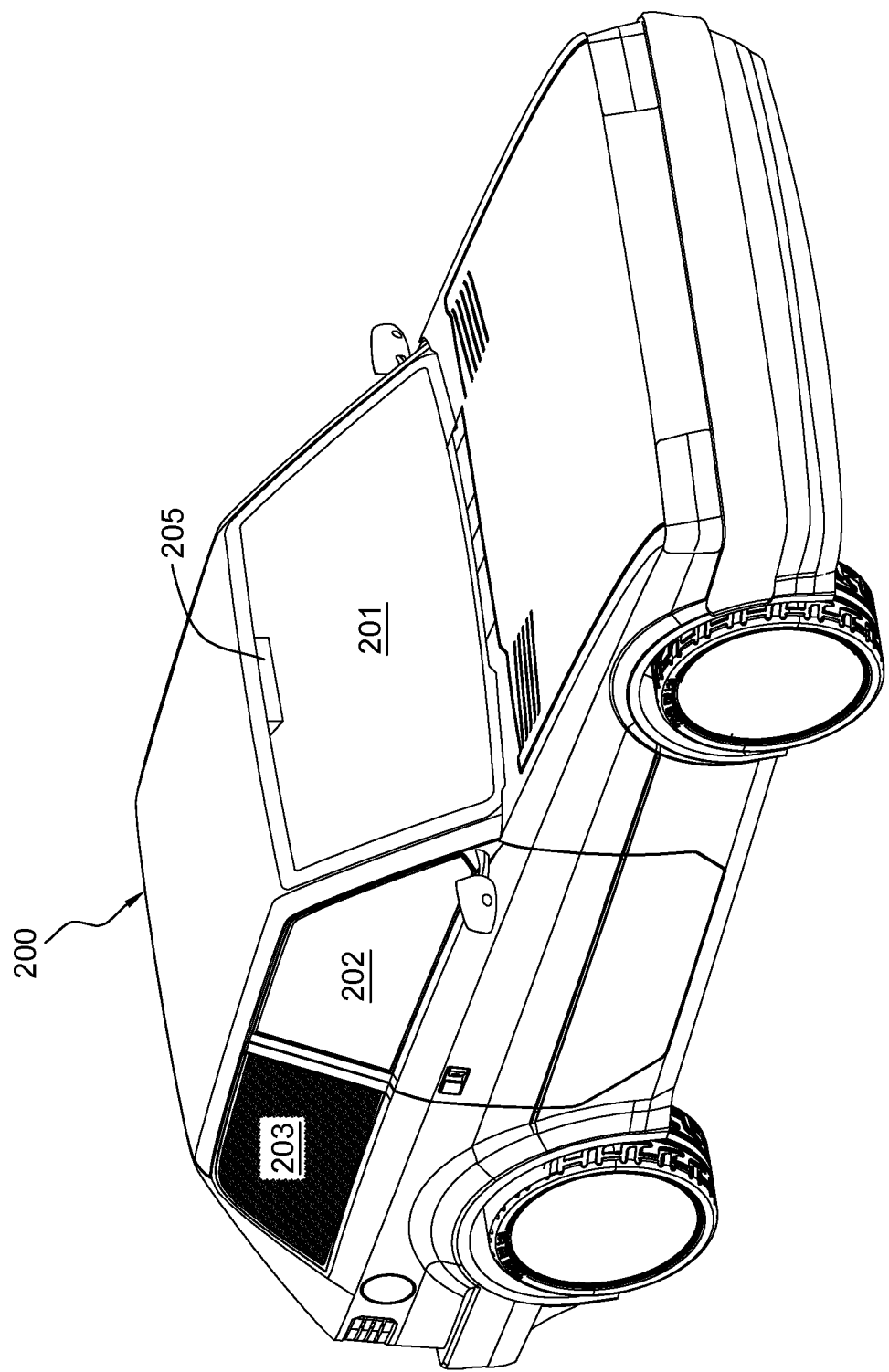
Figure 2D:
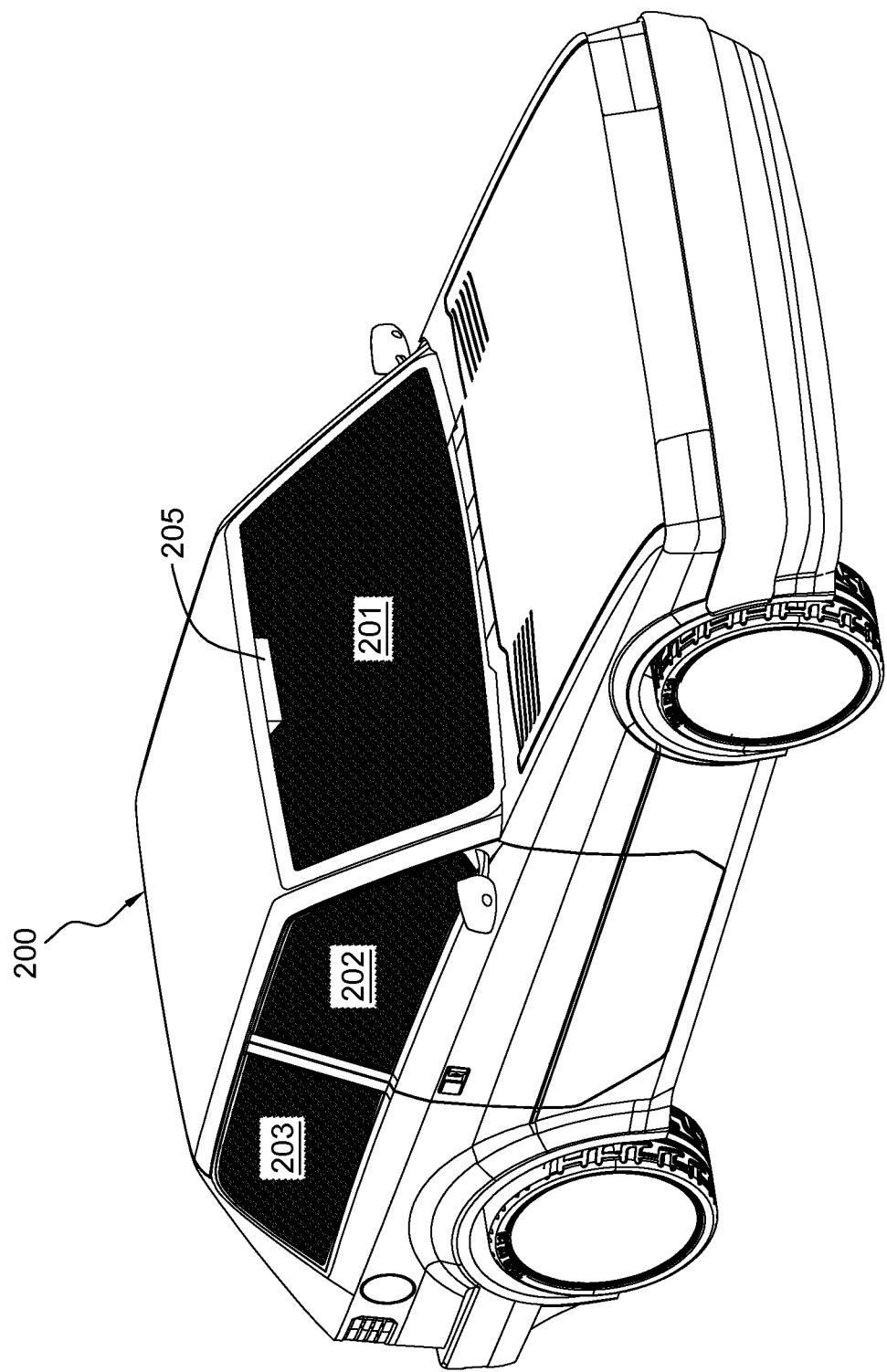

In FIG. 2B, system 205 detected that the occupant in the rear seat of vehicle 200 who was sleeping is now awake, and automatically adjusts visual light transmission through rear side window 203 to an intermediate visual light transmission level, similar to front side window 202. Note that in one or more implementations, the visual light transmission level through the individual windows of vehicle 200 could be set to a default level when a specified type of event for which the system is to control visual light transmission is not detected, or could be prespecified by an owner or occupant of the vehicle. FIG. 2C is similar to FIG. 2A, however the specified type of event detected by system 205 is that the driver of the vehicle has turned their gaze to look out the passenger side front window 202, and based thereon, the system has automatically adjusted visual light transmission through the window. For instance, in the embodiment shown, the system has adjusted visual light transmission through the window to a maximum level so as to not impair the driver's view. Note that any of the windows in vehicle 200 could be controlled by the system for any desired type of event, whether occurring within the vehicle, such as an occupant-related event, or outside the vehicle, such as another vehicle, object, individual, etc., approaching the vehicle, as described herein. Also, as shown in FIG. 2D, the smart glass windows 201, 202, 203 may be automatically adjusted or switched to their maximum light-blocking state when the vehicle is not in use, or when an unauthorized user is approaching the vehicle, as discussed further below.

Figure 3:
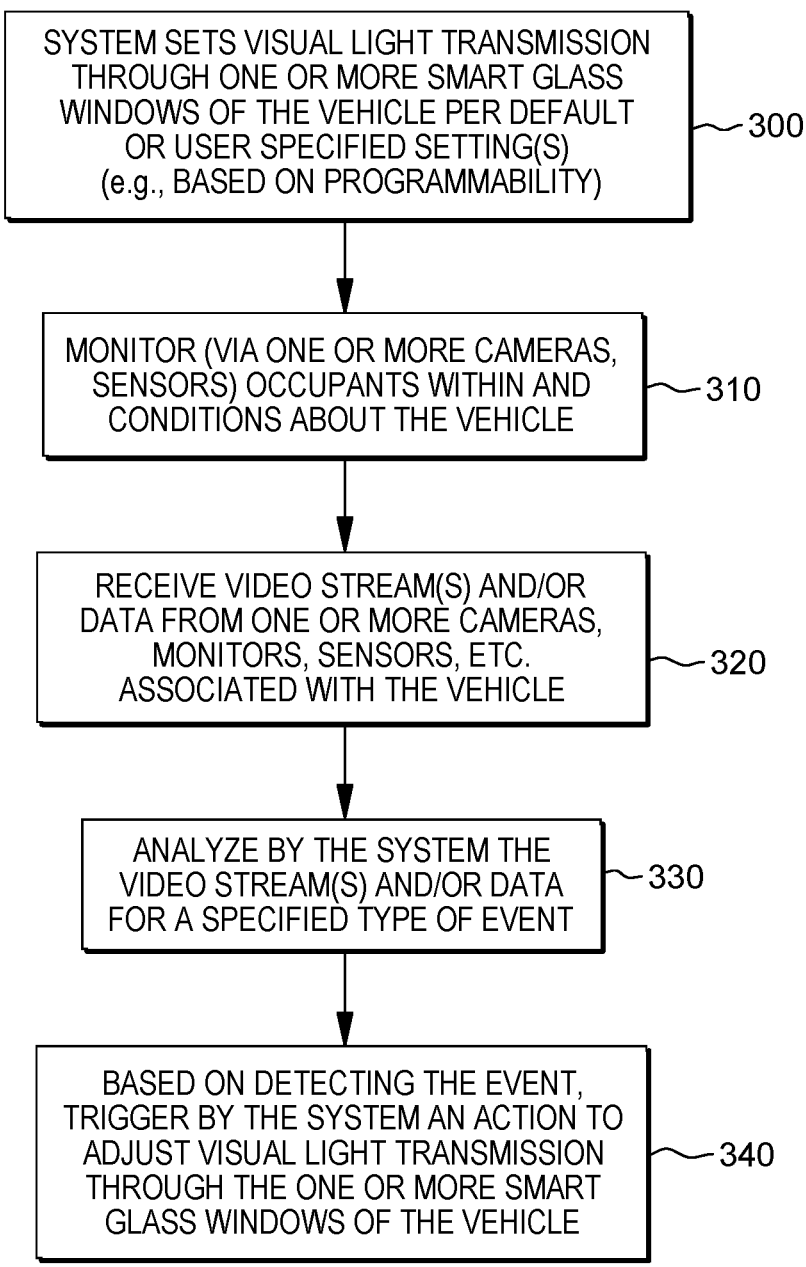
FIG. 3 depicts one example of processing logic, in accordance with one or more aspects of the present invention.

FIG. 3 depicts one embodiment of process logic for controlling visual light transmission through a window of a vehicle, in accordance with one or more aspects of the present invention. The system may set vehicle window light transmission to a default setting, or a user specified setting (where the system is implemented with a programmable user interface) 300. The system monitors, via one or more cameras, monitors, sensors, etc., occupants within and conditions about the vehicle 310. The control system may receive a video stream and/or other data, from one or more cameras, monitors, sensors associated with the vehicle 320, and analyzes the data for an event 330. For instance, a video stream may be received from at least one video camera associated with the vehicle, and image analytics may be used to analyze the video stream to detect a prespecified type of event, such as an occupant sleeping, an occupant turning to gaze out the window, etc. Based on detecting the event, the control system triggers an action to adjust visual light transmission through one or more smart glass windows of the vehicle 340. The action may include providing a control signal, such as an appropriate electrical signal, to the one or more smart glass windows effected. Visual light transmission through a smart glass window of the vehicle may be controlled for a number of different types of events depending, for instance, on whether the vehicle is in use or not in use.

Figure 4:
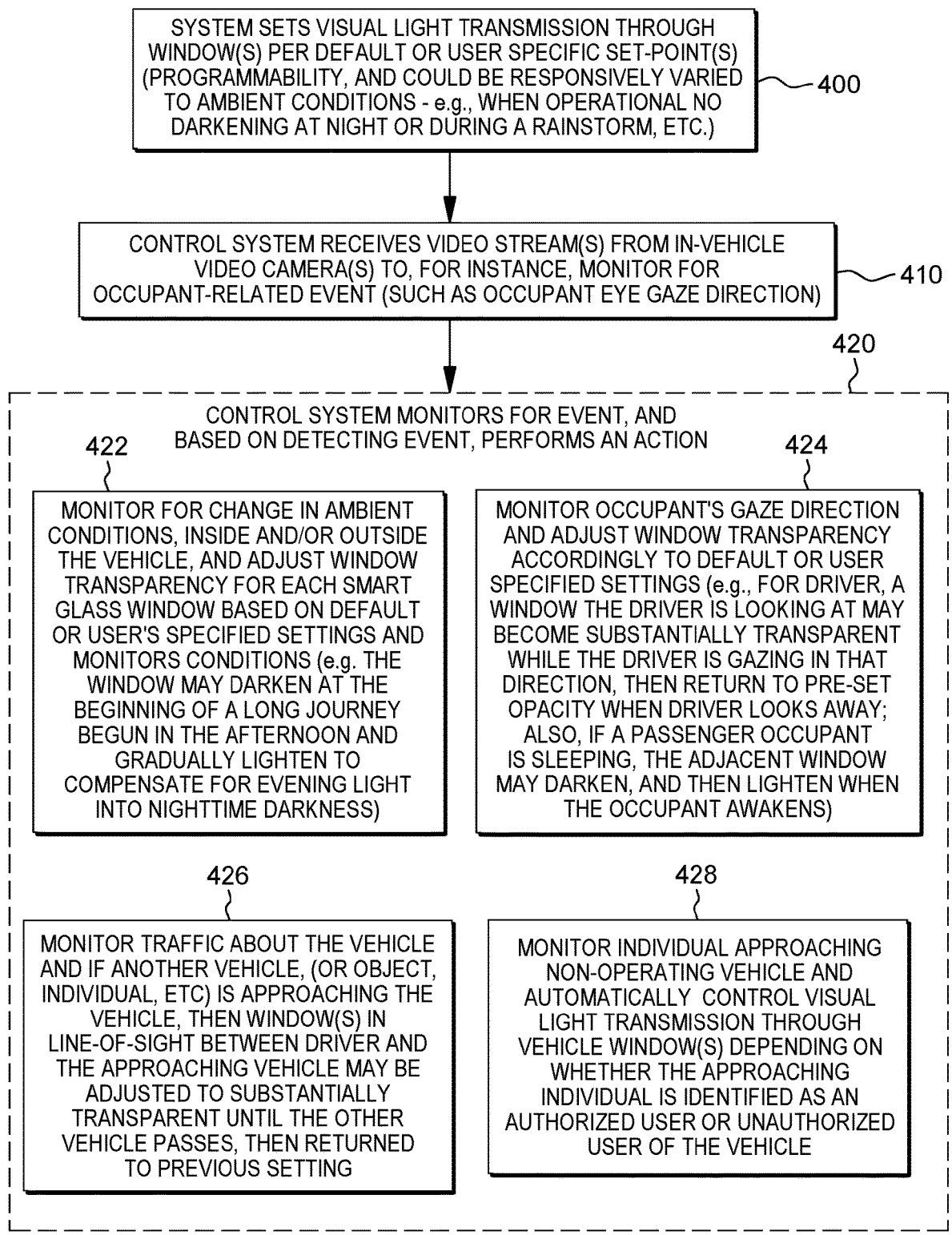
FIG. 4 depicts another embodiment of processing logic, in accordance with one or more aspects of the present invention.

FIG. 4 depicts a further detailed example of processing logic of a system for controlling visual light transmission through a smart glass window of a vehicle, in accordance with one or more aspects of the present invention. As shown in FIG. 4, the system may set window transparency per default settings or user specified set points 400. Programmability of the system (and/or default settings) could also be responsive to ambient conditions about the vehicle. For instance, where a sensor detects that the vehicle is in use at nighttime, or during a rain storm, etc., no visual light transmission restriction through the smart glass window may be provided. The control system may receive one or more video streams from, for instance, one or more in-vehicle video cameras to detect and monitor occupant actions within the vehicle, such as an occupant's eye gaze direction, to determine whether to dynamically adjust visual light transmission through one or more smart glass windows 410.

The control system monitors for one or more specified events and based on detecting a specified event, performs and action 420. By way of example only, the control system may monitor for a change in ambient conditions, whether inside and/or outside the vehicle, and adjust window transparency for each smart glass window based on default settings or user specified settings 422. For instance, the control system may begin with the window darkened at the beginning of a long journey in the afternoon, but gradually lighten the window to compensate for continued use of the vehicle into the night. Note that this feature may be in combination with other aspects disclosed herein for adjusting visual light transmission through the smart glass window based on one or more occupant-related events and/or one or more outside the vehicle events.

As another example, the control system may monitor one or more of the occupants' eye gaze direction, and adjust window transparency accordingly to default or user specified settings 424. For instance, the occupant may be a driver of the vehicle, and the window at issue may be a window that the driver is looking at. The window may become substantially transparent while the driver is gazing in that direction, for instance, looking out a front side window, and then return to a preset visual light transmission level or opacity when the driver looks away. Also, if an occupant is sleeping, one or more of the smart glass windows may be dynamically adjusted to minimize visual light transmission through the window, and then to increase visual light transmission through the one or more smart glass windows once the occupant awakes.

In one or more other implementations, the system may monitor traffic about the vehicle, and if another vehicle is approaching the vehicle, then visual light transmission through windows in the driver's line of sight may be automatically adjusted to, for instance, substantially transparent until the other vehicle passes, at which point the visual light transmission level through the effected smart glass window(s) may be reset to their previous level 426.

In one or more other embodiments, the system may monitor an individual approaching the vehicle and automatically control visual light transmission through one or more vehicle windows depending on whether the approaching individual is an authorized user of the vehicle or an unauthorized user 428. For instance, the control system may detect via facial recognition analysis that the individual approaching the vehicle when the vehicle is not in operation is an unauthorized user, and as such, may automatically darken or minimize (or maintain dark) visual light transmission through the smart glass windows (as shown in FIG. 2D). Alternatively, where the system recognizes that the approaching user is an authorized user of the vehicle, then the system may automatically transition the smart glass window(s) to maximum visual light transmission through the smart glass in order that the authorized user may see into the cabin of the vehicle.

As will be understood from the description provided herein, the specified type of event for initiating action to dynamically control visual light transmission through one or more smart glass windows of a vehicle may be any of multiple possible prespecified types of events. The system is a smart glass transparency adjusting system which uses, in one or more aspects, an in-vehicle video camera to monitor, for instance, one or more occupants of the vehicle, and based on the monitoring, to dynamically adjust visual light transmission through the smart glass window(s) of the vehicle. For instance, the system may monitor a driver of the vehicle to determine when the driver turns their head, or moves their eye gaze towards a particular window, responsive to which the system may dynamically adjust visual light transmission through that window. Further, one or more passenger occupants may be monitored and depending on their activities, visual light transmission through one or more windows of the vehicle may be dynamically adjusted. Note that the system may also use information determined from the video stream to create an authorized user or occupant database (such as the video/data repository 124 of FIG. 1), where the system automatically identifies occupants from previous trips in the vehicle.

The control system dynamically adjusts visual light transmission through the smart glass window by, for instance, controlling a level of voltage to the smart glass window. The system adjusts dynamically the visual light transmission level through one or more smart glass windows of the vehicle based on the analyzed video stream(s), and detection of one or more prespecified types of events, such as a passenger occupant falling asleep, or a driver occupant or passenger occupant gazing out the window. Cognitive facial recognition may be employed to analyze the video stream data, and based thereon adjust visual light transmission level through one or more smart glass windows, such as in a theft prevention scenario (by an unauthorized user) described herein. Further, the system may analyze the video stream(s), such as a video stream imaging a portion of a region outside of the vehicle, to determine whether another vehicle, or object, is overtaking the vehicle, or determine how far away a vehicle or object is from the vehicle. Note that this is video analytics-based sensing, rather than other types of sensing, which could also be used in combination with the video stream analysis disclosed herein.

To restate, numerous control scenarios are possible based on the control system receiving a video stream and analyzing the video stream for one or more specified types of events. For instance, the system may evaluate the video stream to determine whether the driver turns their head and/or eye gaze towards a particular smart glass window, and if so, may send a signal to dynamically transition visual light transmission through the smart glass to, for instance, a transparent state. In another embodiment, the specified event may be a passenger occupant taking a nap, and the driver is looking out the windshield. In such a case, the system may dynamically adjust visual light transmission through the smart glass window closest to the napping occupant by switching the smart glass to a specified opacity level.

In another implementation, the specified event may be a driver or passenger occupant looking out of the smart glass window, in which case the system may dynamically adjust visual light transmission through the window for improved passenger viewing.

In one or more embodiments, the specified event may be a passenger occupant looking out the smart glass window and moving their head closer to the window in order to see something clearer, in which case the system may dynamically adjust visual light transmission through the smart glass window to increase light transmission and thereby assist the passenger's visibility.

In one or more embodiments, the specified event may be another vehicle overtaking the vehicle, and the system may dynamically adjust visual light transmission through the smart glass window to assist the driver's realization that the other vehicle is approaching.

In one or more embodiments, the vehicle may be parked and not in use, with the system identifying an unauthorized user approaching, based, for instance, on facial recognition and comparison to a database of authorized or previous users of the vehicle, and (in which case) the system may dynamically adjust visual light transmission through the smart glass windows to a nontransparent level to prevent the unauthorized user from seeing into the vehicle. Note that in this particular implementation, all the windows in the vehicle may be smart glass windows.

In one or more implementations, the video stream(s) may be used by the control system to track and tally frequency of usage of each occupant of the vehicle. For instance, the mileage that a particular recognized occupant has rode in the vehicle may be determined, as well as, how many times an occupant has been recognized, how many times has the occupant entered and exited the vehicle, along with (if desired) estimates of the occupant's age, height, etc., or other characteristics. If the recognized occupant information reaches a certain predefined regular occupant criteria, then the occupant's identification may be placed into a saved, authorized user list, which may then be used in comparison to an individual approaching the vehicle to determine whether the smart glass windows are to be dynamically adjusted to limit visual light transmission into the vehicle. Note that in one or more other implementations, the smart glass windows may automatically darken to, for instance, a minimum visual light transmission level when the vehicle is not in use and may be controlled to dynamically adjust to a higher visual light transmission level upon the system detecting an approaching authorized user.

FIGS. 5A & 5B depict one embodiment of an overview of various control processes, in accordance with one or more aspects of the present invention. As depicted in FIG. 5A, a method of controlling visual light transmission through a window of a vehicle is provided 500. Controlling visual light transmission through the window of the vehicle may include providing a control system for controlling visual light transmission through the window. The window includes smart glass, with visual light transmission through the window being dynamically adjustable by the control system. The control system receives a video stream from at least one video cameras associated with the vehicle, and analyzes the video stream for a specified event, where detection of the event triggers an action by the control system to adjust visual light transmission through the window.

In one or more implementations, the video stream is captured by at least one in-vehicle video camera imaging, at least in part, occupants of vehicle, and the event is an occupant-related event 505. In one or more embodiments, the window of the vehicle is a side window of the vehicle, the occupant-related event is an occupant of the vehicle sleeping, and the control system is configured to automatically decrease visual light transmission through the side window based on detecting the event 510. In one or more embodiments, the side window of the vehicle is a side window of multiple side windows the vehicle, and the side window is located closest to the occupant of the vehicle 515.

In one or more embodiments, the window of the vehicle is a side window of the vehicle, the occupant-related event is an occupant of the vehicle turning to look out the side window, and the control system is configured to automatically increase visual light transmission through at least a portion of the side window based on detecting the event 520.

As shown in FIG. 5B, in one or more embodiments, the window of the vehicle is a side window, the at least one video camera associated with the vehicle is positioned to image, at least in part, a region outside of the vehicle, and the event is an outside the vehicle event, and the control system is configured to automatically increase visual light transmission through the side window based on detecting the outside the vehicle event 525. In one or more embodiments, the outside the vehicle event may be another vehicle approaching the vehicle 530.

In one or more embodiments, analyzing the video stream may include performing facial recognition analysis on an individual approaching the vehicle, and the event may include identifying by the facial recognition analysis the individual as an authorized user of the vehicle in comparison to a database of authorized users, and the control system may be configured to automatically adjust the visual light transmission through the window for the authorized user to a specified level 535. For instance, the control system may be configured to automatically increase visual light transmission through the window for the authorized user 540.

In one or more embodiments, the analyzing by the control system may include performing facial recognition analysis on an individual approaching the vehicle, and the event may include identifying by the facial recognition analysis the individual as an unauthorized user of the vehicle in comparison to a database of authorized users, and the control system may be configured to automatically decrease visual light transmission through the window for the unauthorized user 545.

In one or more embodiments, the event may be one type of event of multiple specified types of events, each specified type of event of the multiple specified types of events triggering a respective action by the control system to adjust the visual light transmission through the window to a specified level 550. The respective actions may include multiple different prespecified actions to be taken by the control system to adjust the visual light transmission through the window based on the specified type of event.

One example of a computer system that includes processors that may be used by one or more aspects of the present invention is described with reference to FIG. 6A. In this example, the computer system is part of a computing environment including additional components that may or may not be used by aspects of the present invention.

Figure 6A:
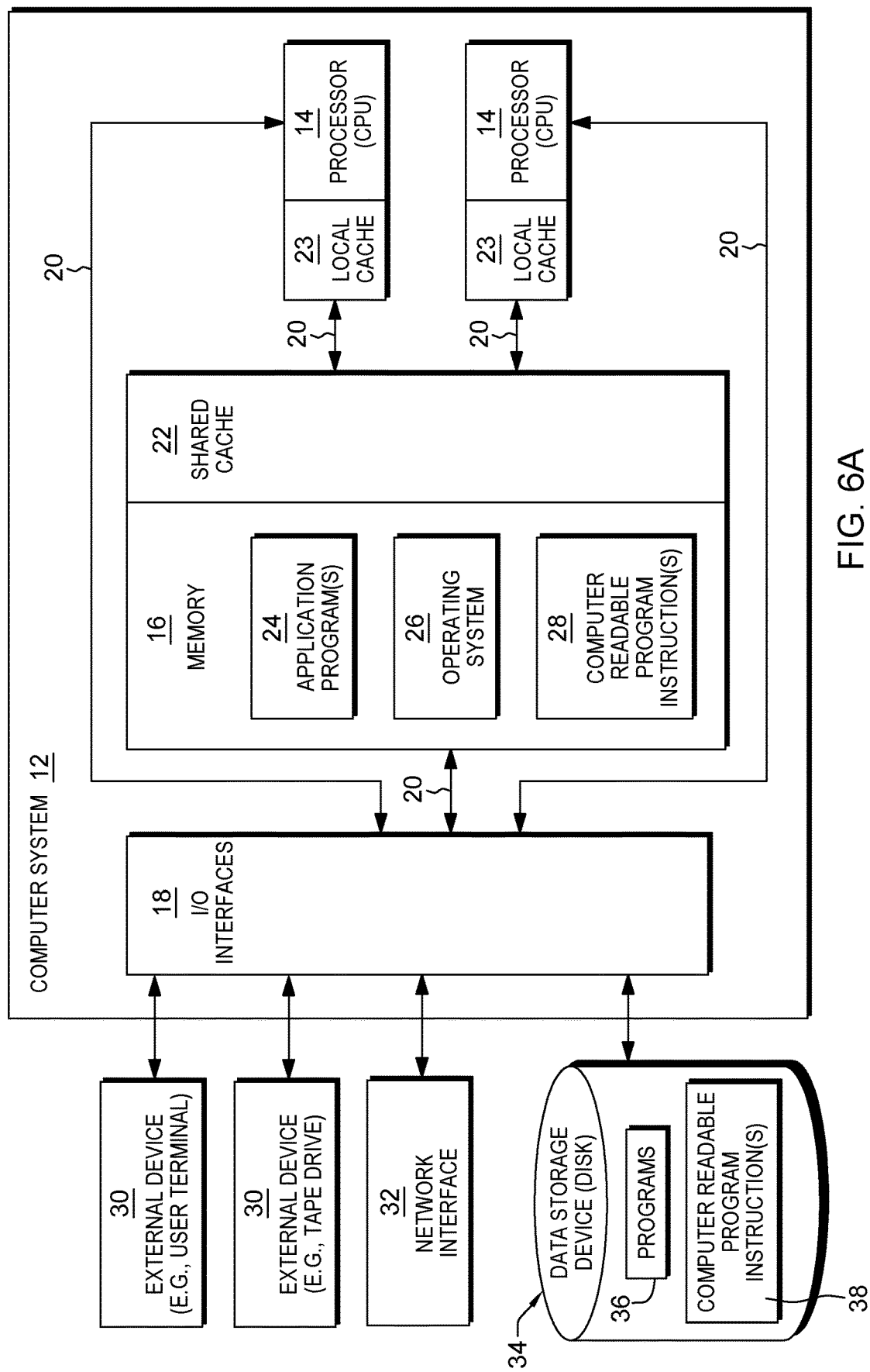
FIG. 6A depicts one example of a computing environment to incorporate and use one or more aspects of the present invention.

As shown in FIG. 6A, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more components to perform one or more aspects of the present invention. These components may be stored in memory, including main memory (e.g., memory 16) and/or one or more caches (e.g., shared cache 22, local cache 23) and/or external storage (e.g., device 34), and may be executed by one or more processors (e.g., processor 14).

Figure 6B:
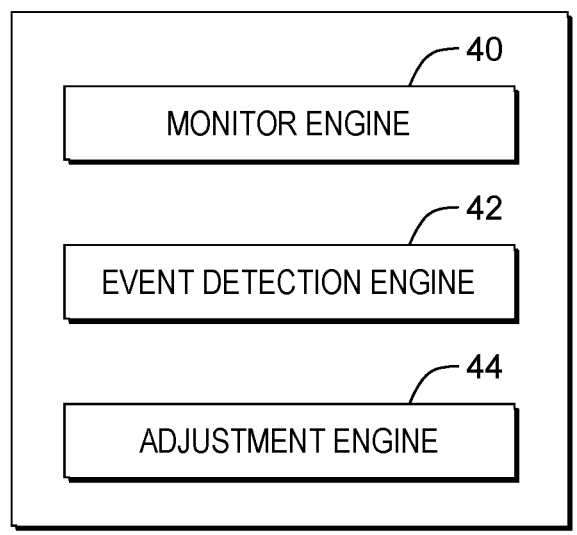
FIG. 6B depicts further details of a processor of FIG. 6A, in accordance with one or more aspects of the present invention.

In one example, referring to FIG. 6B, the components may include a monitoring engine 40 used in monitoring for events; a detection engine 42 used in detecting a particular type of event; and an adjustment engine to initiate an action to automatically adjust visual light transmission through one or more smart glass windows of the vehicle. The components executed by a processor may be individual components or combined in one component. Further, other components may be included to perform one or more other tasks. Many variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
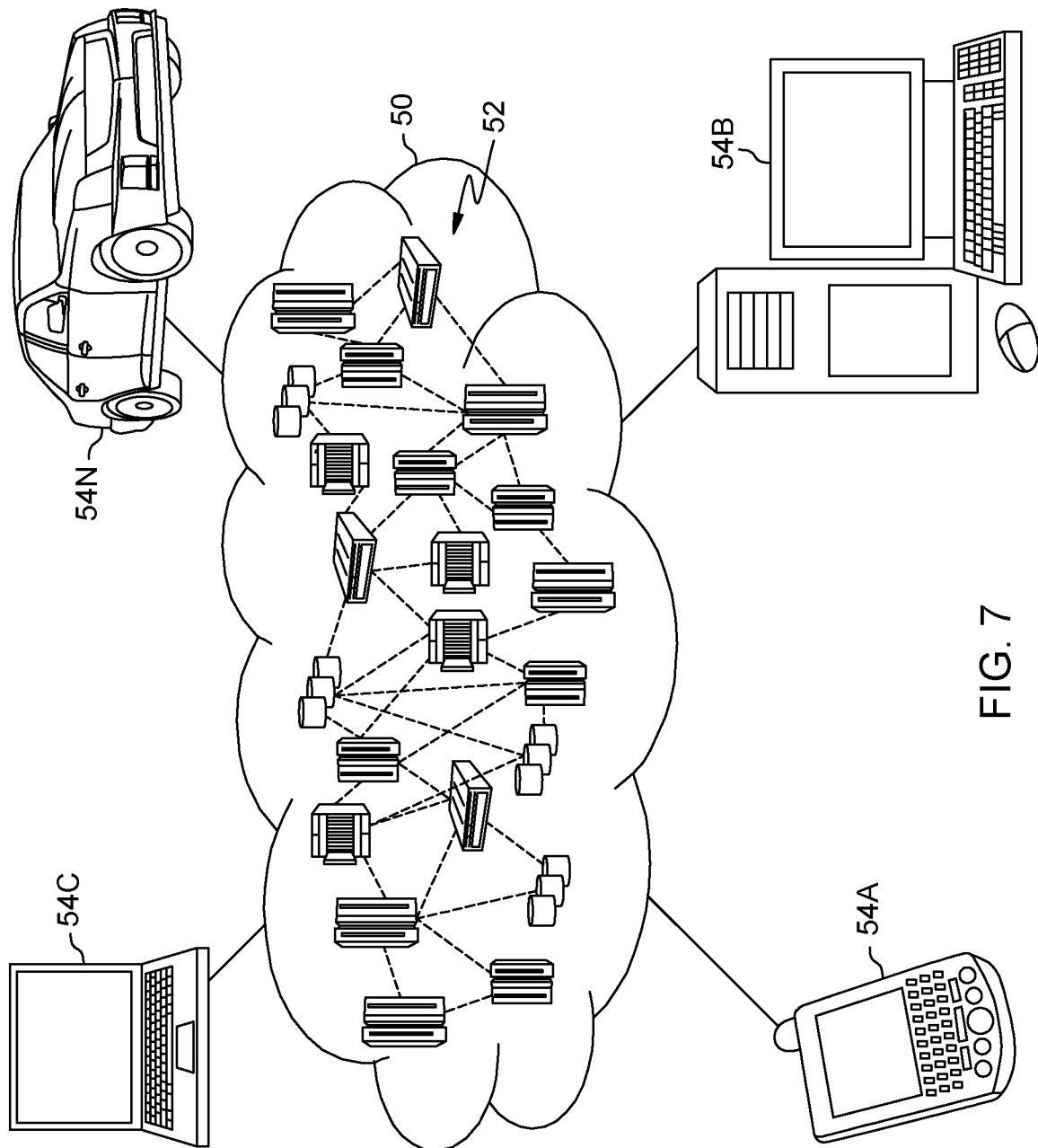
FIG. 7 depicts one embodiment of a cloud computing environment, which may implement, or be used in association with, one or more aspects of the present invention.

Referring now to FIG. 7, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 8:
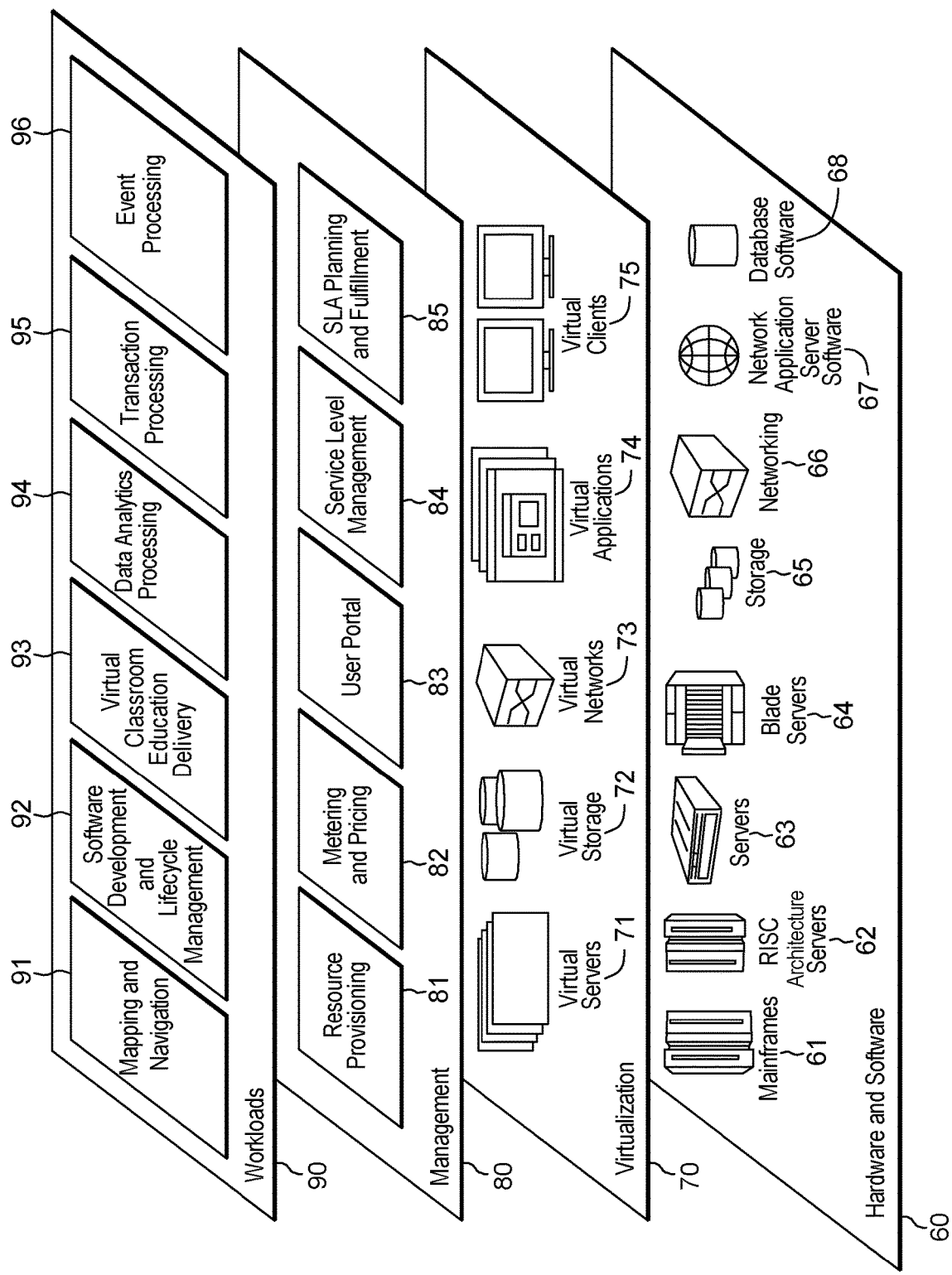
FIG. 8 depicts one example of abstraction model layers, which may facilitate or implement controlling visual light transmission through one or more windows of a vehicle, in accordance with one or more aspects of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event processing 96, which includes, for instance, controlling visual light transmission through a window of a vehicle.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of devices and/or tracking components may be used in one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of controlling visual light transmission through a window of a vehicle, the method comprising:
   providing a control system for controlling visual light transmission through the window, the window comprising smart glass, with visual light transmission through the window being dynamically adjustable by the control system between a minimum light-blocking state of the smart glass and a maximum light-blocking state of the smart glass, wherein the control system:
   receives a video stream from at least one video camera associated with the vehicle;
   analyzes the video stream for a specified event, wherein detection of the event triggers an action by the control system to adjust the visual light transmission through the window between the minimum light-blocking state and the maximum light-blocking state of the smart glass;
   detects whether an individual approaching the vehicle when in non-operating state is an authorized user of the vehicle or an unauthorized user of the vehicle; and
   adjusts light transmission through the smart glass of the vehicle in non-operating state, between the minimum light-blocking state and the maximum light-blocking state of the smart glass, based on the individual being detected as authorized user or unauthorized user of the vehicle, the smart glass being in maximum light-blocking state where the individual is an unauthorized user.

2. The method of claim 1, wherein the video stream is captured by at least one in-vehicle video camera imaging, at least in part, one or more occupants of the vehicle, and the event is an occupant-related event.

3. The method of claim 2, wherein the window of the vehicle is a side window of the vehicle, the occupant-related event is an occupant of the vehicle sleeping, and the control system is configured to automatically decrease visual light transmission through the side window based on detecting the event.

4. The method of claim 3, wherein the side window of the vehicle is one side window of multiple side windows of the vehicle, the one side window being located closest to the occupant of the vehicle.

5. The method of claim 2, wherein the window of the vehicle is a side window of the vehicle, the occupant-related event is an occupant of the vehicle turning to look out the side window, and the control system is configured to automatically increase visual light transmission through at least a portion of the side window based on detecting the event.

6. The method of claim 1, wherein the window of the vehicle is a side window of the vehicle, the at least one video camera associated with the vehicle is positioned to image, at least in part, a region outside the vehicle, and the event is an outside the vehicle event, and the control system is configured to automatically increase visual light transmission through the side window based on detecting the outside the vehicle event.

7. The method of claim 6, wherein the outside the vehicle event is another vehicle approaching the vehicle.

8. The method of claim 1, wherein the analyzes comprises performing facial recognition analysis on the individual approaching the vehicle, and the event comprises identifying by the facial recognition analysis the individual as an authorized user of the vehicle, and wherein the control system is configured to automatically adjust the visual light transmission through the window for the authorized user to a specified level.

9. The method of claim 8, wherein the control system is configured to automatically increase visual light transmission through the window for the authorized user by transitioning the smart glass to the minimum light-blocking state.

10. The method of claim 1, wherein the analyzes comprises performing facial recognition analysis on an individual approaching the vehicle, and the event comprises identifying by the facial recognition analysis the individual as an unauthorized user of the vehicle, and wherein the control system is configured to automatically decrease visual light transmission through the window for the unauthorized user to the maximum light-blocking state of the smart glass.

11. The method of claim 1, wherein the event is a specified type of event of multiple specified types of events, each specified type of event of the multiple specified types of events triggering a respective control action by the control system to adjust visual light transmission through the window, the respective control actions comprising multiple different prespecified actions to be taken by the control system to adjust the level of visual light transmission through the window based on the specified type of event.

12. A system for controlling visual light transmission through a window of a vehicle, the system comprising:
　a memory; and
　a processor communicatively coupled to the memory, wherein the system performs a method comprising:
　　controlling visual light transmission through the window, the window comprising smart glass, with visual light transmission through the window being dynamically adjustable between a minimum light-blocking state of the smart glass and a maximum light-blocking state of the smart glass, the controlling including:
　　　receiving a video stream from at least one video camera associated with the vehicle;
　　　analyzing the video stream for a specified event, wherein detection of the event triggers an action to adjust the visual light transmission through the window between the minimum light-blocking state and the maximum light-blocking state of the smart glass;
　　　detecting whether an individual approaching the vehicle when in non-operating state is an authorized user of the vehicle or an unauthorized user of the vehicle; and
　　　adjusting light transmission through the smart glass of the vehicle in non-operating state, between the minimum light-blocking state and the maximum light-blocking state of the smart glass, based on the individual being detected as authorized user or unauthorized user of the vehicle, the smart glass being in maximum light-blocking state where the individual is an unauthorized user.

13. The system of claim 12, wherein the window of the vehicle is a side window of the vehicle, the video stream is captured by at least one in-vehicle video camera imaging, at least in part, one or more occupants of the vehicle, and the event is an occupant-related event, and wherein the occupant-related event is an occupant of the vehicle sleeping, and the control system is configured to automatically decrease visual light transmission through the side window based on detecting the event.

14. The system of claim 12, wherein the window of the vehicle is a side window of the vehicle, the video stream is captured by at least one in-vehicle video camera imaging, at least in part, one or more occupants of the vehicle, and the event is an occupant-related event, wherein the occupant-related event is an occupant of the vehicle turning to look out the side window, and the control system is configured to automatically increase visual light transmission through at least a portion of the side window based on detecting the event.

15. The system of claim 12, wherein the window of the vehicle is a side window of the vehicle, the at least one video camera associated with the vehicle is positioned to image, at least in part, a region outside the vehicle, and the event is an outside the vehicle event, and the control system is configured to automatically increase visual light transmission through the side window based on detecting the outside the vehicle event.

16. The system of claim 12, wherein the analyzing comprises performing facial recognition analysis on the individual approaching the vehicle, and the event comprises identifying by the facial recognition analysis the individual as an authorized user of the vehicle, and wherein the control system is configured to automatically adjust the visual light transmission through the window for the authorized user to a prespecified level.

17. The system of claim 16, wherein the control system is configured to automatically increase visual light transmission through the window for the authorized user by transitioning the smart glass to the maximum light-blocking state.

18. The system of claim 12, wherein the analyzing comprises performing facial recognition analysis on an individual approaching the vehicle, and the event comprises identifying by the facial recognition analysis the individual as an unauthorized user of the vehicle, and wherein the control system is configured to automatically decrease visual light transmission through the window for the unauthorized user to the maximum light-blocking state of the smart glass.

19. The system of claim 12, wherein the event is a specified type of event of multiple specified types of events, each specified type of event of the multiple specified types of events triggering a respective control action by the control system to adjust visual light transmission through the window, the respective control actions comprising multiple different prespecified actions to be taken by the control system to adjust the level of visual light transmission through the window based on the specified type of event.

20. A computer program product for controlling visual light transmission through a window of a vehicle, the computer program product comprising:
　a computer readable storage medium having program instructions embodied therewith, the program instructions being executable by a processor to cause the processor to:
　　control visual light transmission through the window, the window comprising smart glass, with visual light transmission through the window being dynamically adjustable between a minimum light-blocking state of the smart glass and a maximum light-blocking state of the smart glass, and the control including:

receiving a video stream from at least one video camera associated with the vehicle;

analyzing the video stream for a specified event, wherein detection of the event triggers an action to adjust the visual light transmission through the window between the minimum light-blocking state and the maximum light-blocking state of the smart glass;

detecting whether an individual approaching the vehicle when in non-operating state is an authorized user of the vehicle or an unauthorized user of the vehicle; and adjusting light transmission through the smart glass of the vehicle in non-operating state, between the minimum light-blocking state and the maximum light-blocking state of the smart glass, based on the individual being detected as authorized user or unauthorized user of the vehicle, the smart glass being in maximum light-blocking state where the individual is an unauthorized user.

* * * * *